United States Patent Office 2,882,305
Patented Apr. 14, 1959

2,882,305

PRODUCTION OF ORGANIC PHOSPHONYL HALIDE

John W. Copenhaver, Short Hills, and Charles W. Weber, Jersey City, N.J., assignors to The M. W. Kellogg Company, Jersey City, N.J., a corporation of Delaware No Drawing. Application October 30, 1953
Serial No. 389,482

22 Claims. (Cl. 260—543)

This invention relates to a method for the manufacture of an organic phosphonyl halide. In one aspect the invention relates to the production of alkyl phosphonyl halides, including acyclic and alicyclic alkyl phosphonyl halides. In one of its more particular aspects, the invention relates to the production of methane phosphonyl dichloride.

The oganic phosphonyl halides and especially methane phosphonyl dichloride are much in demand as intermediate chemical reactants for the production of more complex organic phosphorus compounds, such as the corresponding esters, free acids and amides by conventional methods, which are useful as fungicides, insecticides, pharmaceuticals, petroleum additives to improve the stability and quality of lubricating oils, and polymer additives. The conventional method for producing the organic phosphonyl halides is illustrated by the following reactions:

(1) 

(2) 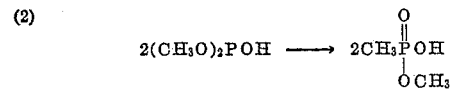

(3) 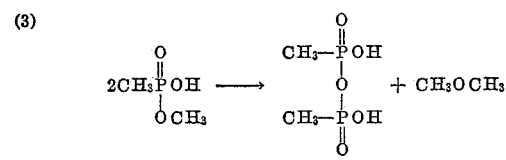

(4) 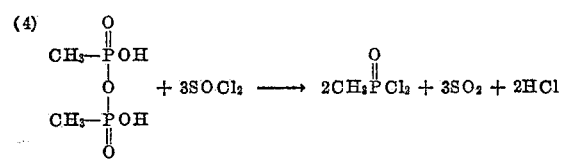

It has now been found that improved yields of organic phosphonyl halides may be obtained by a multi-stage process comprising reacting a phosphorus trihalide and an organic compound, such as the organic ethers, esters, acetals and ketals.

An object of this invention is to provide a process for producing organic phosphonyl halides in improved yields and selectively.

Another object of this invention is to provide a method for producing methane phosphonyl dichloride with the minimum formation of by-products and the maximum utilization of reactants.

Various other objects and advantages of the present invention will become apparent to those skilled in the art from the accompanying description and disclosure.

In accordance with this invention an organic phosphonyl halide having the general formula,

where R is an organic radical including the substituted radicals, such as an aralkyl radical or a halogen substituted acyclic or alicyclic alkyl radical, and X is any of the halogens (Br, Cl, I, F) and the X's may be the same or different halogen atoms, is produced by directly reacting a phosphorus halide, preferably a phosphorus trihalide, having halogens corresponding to the halogens of the desired product with an organic compound of the formula: R—O—R' in which R is an organic radical and is the same as the R of the general formula for the organic phosphonyl halide and R' is a radical containing an organic group, in two successive reaction stages in the presence of a catalyst. The reaction of this invention is conducted as a multi-stage reaction, and preferably as a two-stage reaction. Conducting the reaction in such a stepwise manner comprises reacting in the first step of the reaction the phosphorus trihalide and the organic reactant in the presence of the catalyst, the second and subsequent steps then comprise treating the product obtained in the first step with additional amounts of the same reactants used in the first step with or without the addition of more catalyst and with or without separating of the low boiling products from the residue or catalyst complex. In so conducting the reaction in this stepwise manner improved yields of organic phosphonyl halides are obtained by using smaller amounts of catalyst as compared to the amount of catalyst needed when the reaction is conducted as a one-stage reaction. The organic phosphonyl halide produced may be recovered directly from the reaction mixture by conventional methods, such as distillation, or may be reacted with other compounds to form derivatives thereof and the de- derivative recovered.

Various phosphorus trihalides may be employed, such as phosphorus trifluoride, phosphorus trichloride, phosphorus tribromide, phosphorus triiodide and diphosphorus tetra-iodide; and the mixed halide phosphorus trihalides, such as fluoro phosphorus dichloride, difluoro phosphorus chloride, fluoro chloro phosphorus bromide, dichloro phosphorus iodide and dichloro phosphorus bromide. The particular phosphorus trihalide employed depends upon the ultimate product desired. When producing an organic phosphonyl dichloride, phosphorus trichloride is preferred.

The organic compounds of the formula R—O—R' to be reacted with the phosphorus halide include the ethers, esters, acetals and ketals and are preferably those compounds in which R is an alicyclic or acyclic alkyl radical having not more than eight carbon atoms and R' is an organic radical, preferably having a continuous carbon skeleton and not more than 8 carbon atoms, i.e., all carbon attached together, —C—C—C—. Mixtures of two or more different organic compounds (R—O—R') may be reacted with the phosphorus trihalide without departing from the scope of this invention. In case R or R' are halogen substituted radicals the halogens may be any of the group F, Cl, I and Br, however, chlorine and bromine are perferred.

The preferred organic ethers are selected from the group consisting of the acyclic and alicyclic alkyl ethers including the substituted acyclic alkyl ethers, such as the halo, nitro, cyano and aryl substituted ethers. Examples of ethers are the simple symmetrical ethers, such as dimethyl ether, diethyl ether; dicyclohexyl ether; dibenzyl ether; beta,beta'-dichloro diethyl ether; and beta,beta'-oxy diproprionitrile. The simple unsymmetrical ethers may also be employed but, with the exception of the mono-alpha halogenated alkyl ethers, the unsymmetrical ethers lead to the formation of mixed products corresponding to the different alkyl or cycloalkyl radicals of the ether. Of such unsymmetrical ethers, examples are: methyl ethyl ether, methyl n-butyl ether, ethyl n-propyl ether, methyl t-butyl ether, cyclohexyl methyl ether, 2-nitropropyl methyl ether and methyl benzyl ether. The mono-alpha halogenated alkyl ethers having the general formula, $$R''\overset{X}{\underset{|}{C}}H-OR$$

where $$R''\overset{X}{\underset{|}{C}}H-$$

corresponds to the R' group of the general formula, R—O—R', and R" is hydrogen or an alkyl radical and the R group is found in the final product, are particularly good substituted ethers which may be used; examples are chloromethyl methyl ether; bromomethyl ethyl ether, alpha-chloroethyl propyl ether and bromomethyl isoamyl ether. X of the above formula is a halogen (Cl, F, Br, I). Instead of using simple ethers containing only one ether linkage, poly ethers, such as polyoxymethylene, polyoxyethylene and polyoxypropylene alcohols may be employed in this invention.

Examples of the esters include the mono esters, the poly esters and the ortho esters. Preferred mono esters are: methyl formate, methyl acetate, butyl acetate, benzyl acetate and methyl proprionate. Suitable ortho esters include trimethyl ortho formate, trimethyl ortho acetate, dimethyl cyclobutyl ortho acetate and trimethyl ortho benzoate. Examples of polyesters are: dimethyl oxalate, dimethyl phthalate and dimethyl adipate. Other esters include the polyesters of inorganic acids, such as dimethyl carbonate, dimethyl sulfate, diethyl sulfate, trimethyl borate, tributyl borate and triethyl phosphate.

Suitable acetals include dimethyl formal, diethyl formal, dimethyl acetal and diethyl benzal.

Examples of ketals for use in this invention are: dimethyl ketal of acetone and cyclohexanone.

The reaction of this invention is carried out in the presence of a catalyst, preferably a catalyst containing iodine. Examples of suitable iodine-containing catalysts which may be used in accordance with this invention are: metal iodides, such as nickel iodide, zinc iodide, cobalt iodide, sodium iodide, aluminum iodide and manganese iodide; phosphorus iodides, such as phosphorus di-iodide and phosphorus tri-iodide; phosphonium iodides, such as trimethyl phosphonium di-iodide; alkyl iodides, such as methyl iodide; free iodine; and a metal chlorophosphine, such as nickel tetrakistrichlorophosphine, in combination with a metal iodide, such as nickel iodide. Conventional Friedel-Crafts type catalysts may also be used, such as aluminum chloride, aluminum bromide, stannic chloride, zinc chloride, boron trifluoride and hydrogen fluoride. Any combination of mixtures of these catalysts may also be used without departing from the scope of this invention. Generally the catalyst is employed in an amount between about 0.001 mole to about 1 mole per mole of organic ether, the preferable amount being between about 0.005 mole and about 0.5 mole per mole of ether.

A typical overall equation representing the reaction of this invention for both stages is:

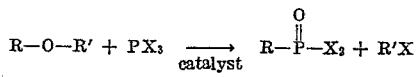

where R and R' are organic radicals and X is a halogen atom, as previously discussed. Both R and R' and X may be the same or different atoms of their respective groups. The above reaction is carried out generally at a temperature above about room temperature (20° C.) and below the decomposition temperature of the reactants in all stages of the process. Generally the temperature will be not higher than about 500° C. The reaction is preferably carried out in the liquid phase in all stages of the process and this is accomplished by employing sufficient pressure to maintain the reactants in liquid phase condition in the reaction zone at the temperature employed. Conveniently, the reaction is carried out under autogenous conditions of pressure in each stage. The preferred temperature range for liquid phase operations at elevated pressures is between about 175° C. and about 275° C.

The ratio of phosphorus trihalide and organic reactant may be varied over relatively wide limits but it is preferable to employ between about equimolar amounts of both reactants and about a four fold molar excess of phosphorus trihalide reactant, initially in each stage of the process. Similarly, the overall time of reaction may vary over relatively wide limits, such as 10 minutes to 30 hours, the preferable time of reaction being about one hour to about 15 hours. The time of reaction being preferably divided equally between the stages of reaction, each stage being between about one and about 15 hours.

The usual procedure for effecting the reaction in two stages is to introduce the reactants and catalyst into the first stage reaction zone and permitting the reaction to continue for about 2 to 10 hours. At this time additional reactants, and if desired some additional catalyst, are added to the reaction mixture and the reaction continued for another period of 2 to 10 hours. The product is then recovered as previously discussed.

Between reaction stages, the products may be distilled from the reaction mixture leaving the residue containing catalyst complexes for the second stage reaction. The residue and unreacted reactants and by-products may be recycled from the second stage to the first stage, particularly in a continuous type reaction process without departing from the scope of this invention. Initiating the first stage reaction with product residue is beneficial as it increases the rate of reaction and yield of desired product.

The reaction may also be carried out in batchwise or continuous systems without departing from the scope of this invention. The reaction may be effected in the presence of liquid diluents, such as chloroform, xylene, benzene, and cyclohexane, in which the reactants are dissolved, or dispersed by mechanical agitation or by conventional emulsifying agents.

Iodine which may be present upon completion of the reaction when using an iodine containing catalyst is conveniently removed by treating the crude product with mercury followed by removal of mercury iodide salts by filtration. The products of the reaction are further purified by conventional techniques, such as distillation or crystallization depending upon the physical nature of the products. The organic phosphonyl halides may be isolated as such or they may be hydrolyzed to the corresponding phosphonic acids which may then be converted to various ester derivatives, or the phosphonyl halides may be converted directly to a desired type ester by conventional methods. The products are identified by the usual methods, such as determination of boiling point and other such physical properties, determination of infrared absorption spectra, percent composition analysis, mass spectrometer analysis, etc.

It is to be understood that the choice of temperature of reaction, contact time, molar quantities of reactants and catalyst to be preferred in any instance will depend upon such factors as the starting materials employed and the product desired, and that the procedure for the isolation and purification of desired products will be dependent upon the physical nature of the products.

The following examples are offered as a better understanding of the present invention and of the reaction of phosphorus trichloride with various organic compounds to produce methane phosphonyl dichloride, but the examples are not to be considered as unnecessarily limiting to the present invention. Although the following examples describe the preparation of methane phosphonyl dichloride, other organic phosphonyl halides may be prepared similarly by the process of this invention, a few illustrative examples of which are: methane phosphonyl dibromide, cyclohexane phosphonyl dichloride, ethane phosphonyl dichloride, iso-propane phosphonyl dichloride, benzyl phosphonyl dichloride, ethane phosphonyl dibromide and 2-chloroethane phosphonyl dichloride.

*Example 1*

A 200 ml. steel pressure bomb was charged with 78.5 ml. (0.9 mole) of phosphorus trichloride, 33.0 grams (0.72 mole) of dimethyl ether and 18.8 grams (0.06 mole) of cobalt iodide. The bomb was closed, placed in a reciprocating shaker, heated to 250° C. and held at this temperature for 7 hours. The bomb was then cooled and vented to atmospheric pressure. The total crude product in the bomb was transferred to a distillation flask and heated until no more liquid distilled. This liquid, which contained some iodine, was diluted with chloroform, shaken with mercury and filtered to remove the mercury iodide salts. After evaporation of the chloroform the residual liquid was subjected to distillation at elevated temperatures and atmospheric pressure to obtain an impure fraction boiling at 158° C. to 185° C. This fraction was found to contain a substantial amount of methane phosphonyl dichloride and a small amount of dimethyl phosphonyl chloride.

*Example 2*

A 200 ml. steel pressure bomb was charged with 106 ml. (1.2 mole) of phosphorus trichloride, 35 ml. (0.4 mole) of chloromethyl methyl ether and 63.8 grams (0.2 mole) of zinc iodide. The procedure of Example 1 was repeated. A fraction with a boiling point of 150° C. to 165° C. considered chiefly of methane phosphonyl dichloride. This fraction was treated once again with mercury to remove the last traces of iodine. The yield of methane phosphonyl dichloride, obtained as white crystals, was 35 percent of the theoretical yield on the basis of the amount of chloromethyl methyl ether used.

*Example 3*

A 200 ml. steel pressure bomb was charged with 106 ml. (1.2 mole) of phosphorus trichloride, 35 ml. (0.4 mole) of dimethyl formal and 24.4 grams (0.1 mole) of phosphorus di-iodide. The procedure of Example 1 was repeated. A fraction boiling at 157° C. to 169° C. was obtained which consisted chiefly of methane phosphonyl dichloride. The yield of methane phosphonyl dichloride was 25 percent of the theoretical yield on the basis of the amount of dimethyl formal used.

*Example 4*

A 200 ml. steel pressure bomb was charged with 106 ml. (1.2 mole) of phosphorus trichloride, 35 ml. (0.4 mole) of dimethyl formal and 27.4 grams (0.067 mole) of phosphorus tri-iodide. The procedure of Example 1 was repeated. A fraction boiling at 160° C. to 172° C. consisted chiefly of methane phosphonyl dichloride. The yield of methane phosphonyl dichloride was 47 percent of the theoretical yield on the basis of the amount of dimethyl formal employed.

*Example 5*

A 200 ml. steel pressure bomb was charged with 106 ml. (1.2 mole) of phosphorus trichloride, 35 ml. (0.4 mole) of dimethyl formal and 20.3 grams (0.08 mole) of free iodine. The procedure of Example 1 was repeated. A fraction boiling at 159° C. to 167° C. was obtained and was found to consist mainly of methane phosphonyl dichloride. The yield of methane phosphonyl dichloride was 29 percent of the theoretical yield on the basis of the amount of dimethyl formal employed.

*Example 6*

A 200 ml. steel bomb was charged with 106 ml. (1.2 mole) of phosphorus trichloride, 35 ml. (0.4 mole) of dimethyl formal and 24.7 grams (0.08 mole) of manganese iodide. The procedure of Example 1 was repeated. A fraction boiling at 160° C. to 168° C. was obtained and consisted chiefly of methane phosphonyl dichloride. The yield of methane phosphonyl dichloride was 51 percent of theoretical yield on the basis of the amount of dimethyl formal used.

*Example 7*

A 200 ml. steel pressure bomb was charged with 106 ml. (1.2 mole) of phosphorus trichloride, 35.4 ml. (0.4 mole) of dimethyl formal and 62.5 grams (0.2 mole) of nickel iodide. The procedure of Example 1 was repeated except that the temperature of reaction was decreased to 225° C. A fraction boiling at 150° C. to 168° C. was obtained and found to consist mainly of methane phosphonyl dichloride. The yield of methane phosphonyl dichloride was 61 percent of the theoretical yield on the basis of the amount of dimethyl formal employed.

*Example 8*

A 200 ml. steel pressure bomb was charged with 21 ml. (0.24 mole) of phosphorus trichloride, 6.09 grams (0.08 mole) of dimethyl formal and 12.5 grams (0.04 mole) of nickel iodide. The bomb was then closed, placed on a reciprocating shaker, heated to 250° C. and held at this temperature for 7 hours. The bomb was then cooled and vented to atmospheric pressure and charged further with 85 ml. (0.96 mole) of phosphorus trichloride and 24.3 grams (0.32 mole) of dimethyl formal. The bomb was then closed, placed in the reciprocating shaker and heated at 250° C. for an additional seven hours. The total crude product in the bomb was transferred to a distillation flask and heated at atmospheric pressure. Two liquid fractions were obtained: the first fraction had a boiling point of 40° C. to 120° C.; and the second fraction had a boiling point of 120° C. to 204° C. The low boiling fraction was freed of iodine by shaking with mercury followed by filtration to remove the mercury iodide salts; this fraction was found to consist essentially of phosphorus trichloride. The high boiling fraction was diluted with purified chloroform, shaken with mercury and filtered to remove the mercury iodide salts. After removal of the chloroform from the high boiling fraction, this fraction was further purified by distillation at elevated temperatures and atmospheric pressure. A liquid fraction having a boiling point of 145° C. to 167° C. contained 41.9 grams of methane phosphonyl dichloride as determined by mass spectrometer analysis. This weight of methane phosphonyl dichloride corresponds to 83 percent of the theoretical yield on the basis of the total amount of dimethyl formal employed.

*Example 9*

Approximately 0.4 mole of dimethyl formal and 1.6 moles of phosphorus trichloride and 0.2 mole of nickel iodide were introduced into a reactor and the reaction effected at a temperature of 250° C. for 7 hours. The product yield was about 60 percent methane phosphonyl dichloride. The methane phosphonyl dichloride and unreacted reactants were separated from the bottoms or residue of the reaction zone. To this residue was added 0.4 mol of dimethyl formal and 1.2 mol of phosphorus trichloride and a reaction effected at 250° C. for 7 hours. The second reaction using the residue of the first reaction as a catalyst or initiator resulted in a yield of better than 75 percent methane phosphonyl dichloride.

The exact composition of active complex or residue from the above reaction is not known. However, it is believed that nickel pyrophosphate is formed in the reaction zone and constitutes at least a portion of the residue. This nickel pyrophosphate appears to act as a catalyst for the reaction either by itself or in its association in some type of complex with by-products of the reaction.

Although the invention has been described with relation to specific reaction conditions and operating techniques, various modifications and alterations may become apparent to those skilled in the art without departing from the scope of this invention.

Having described our invention, we claim:

1. A process for the production of an organic phosphonyl halide which comprises reacting a trivalent phosphorus halide and an organic compound of the formula R—O—R' where R is an alkyl radical having not more than eight carbon atoms and R' is a radical containing an organic group having not more than 8 carbon atoms selected from the group consisting of an unsubstituted alkyl radical, a haloalkyl radical, and a —CH$_2$—O-alkyl radical, in the presence of bottoms from a previous reaction of a phosphorus halide and an organic compound of the formula R—O—R' at a temperature between about 20° C. and about 500° C. to produce an organic phosphonyl halide.

2. A process for the production of an organic phosphonyl halide which comprises reacting a phosphorus trihalide and an organic compound of the formula R—O—R' where R is an alkyl radical having not more than eight carbon atoms and R' is a radical containing an organic group having not more than 8 carbon atoms selected from the group consisting of an unsubstituted alkyl radical, a haloalkyl radical and a —CH$_2$—O-alkyl radical, in the presence of bottoms from a previous reaction of a phosphorus trihalide and an organic compound of the formula R—O—R' at a temperature between about 20° C. and about 500° C. for a period of time between about 10 minutes and about 30 hours to produce an organic phosphonyl halide of the formula

in which X is a halogen atom.

3. The process of claim 2 in which the said reaction is effected in the presence of a metal iodide as catalyst.

4. The process of claim 3 in which the said metal iodide is a nickel iodide.

5. The process of claim 3 in which the said metal iodide is a zinc iodide.

6. The process of claim 3 in which the said metal iodide is a cobalt iodide.

7. The process of claim 2 in which the said reaction is effected in the presence of free iodine as catalyst.

8. The process of claim 2 in which said reaction is effected in the presence of a Friedel-Crafts type catalyst.

9. The process of claim 8 in which said catalyst is aluminum chloride.

10. The process of claim 2 in which said phosphorus trihalide is phosphorus trichloride.

11. The process of claim 2 in which said phosphorus trihalide is phosphorus tribromide.

12. The process of claim 2 in which said phosphorus trihalide is phosphorus triiodide.

13. The process of claim 2 in which said phosphorus trihalide is phosphorus trifluoride.

14. The process of claim 2 in which said phosphorus trihalide is fluoro phosphorus dichloride.

15. The process of claim 2 in which the compound of the formula R—O—R' is an ether.

16. The process of claim 2 in which the compound of the formula R—O—R' is an acetal.

17. The process of claim 15 in which said ether is dimethyl ether.

18. A process for the production of an organic phosphonyl halide which comprises reacting a phosphorus trihalide, an organic compound of the formula R—O—R' where R is an alkyl radical having not more than eight carbon atoms and R' is a radical containing an organic group having not more than 8 carbon atoms selected from the group consisting of an unsubstituted alkyl radical, a haloalkyl radical and a —CH$_2$—O-alkyl radical at a temperature between about 175° C. and about 275° C., the said reaction being conducted as a multistage reaction; the first stage of which comprises reacting a phosphorus trihalide and an organic compound of the general formula R—O—R' for a period of time between about 1 and about 15 hours without addition of further reactants during the first stage, and the second and subsequent stages of which comprises reacting for an additional period of time between about 1 and about 15 hours additional aforesaid phosphorus trihalide and aforesaid organic compound of the general formula R—O—R' in the presence of the bottoms from the first stage to produce an organic phosphonyl halide, and recovering the phosphonyl halide thus produced as a product of the process.

19. The process of claim 18 in which said phosphorus trihalide is phosphorus trichloride and said organic compound of the formula R—O—R' is dimethyl formal and product is methane phosphonyl dichloride.

20. The process of claim 19 in which said first stage reaction is carried out in the presence of nickel iodide as catalyst.

21. The process of claim 18 in which the second stage reaction is carried out in the presence of the total reaction mixture of the first stage reaction.

22. The process of claim 18 in which products of reaction are distilled from the reaction mixture to leave a bottoms between stages.

References Cited in the file of this patent

UNITED STATES PATENTS

| | | |
|---|---|---|
| 2,146,584 | Lipkin | Feb. 7, 1939 |
| 2,252,675 | Prutton et al. | Aug. 12, 1941 |
| 2,276,492 | Jolly et al. | Mar. 17, 1942 |
| 2,489,917 | McCombie et al. | Nov. 29, 1949 |
| 2,500,022 | Brown | Mar. 7, 1950 |
| 2,683,168 | Jensen et al. | July 6, 1954 |

OTHER REFERENCES

Kosolapoff: Organo-phosphorus Compounds (August 1950), pp. 48 and 62.

UNITED STATES PATENT OFFICE
CERTIFICATE OF CORRECTION

Patent No. 2,882,305                                      April 14, 1959

John W. Copenhaver et al.

It is hereby certified that error appears in the printed specification of the above numbered patent requiring correction and that the said Letters Patent should read as corrected below.

Column 5, line 33, for "considered" read -- consisted --; column 6, line 11, for "phopsphorus" read -- phosphorus --.

Signed and sealed this 20th day of October 1959.

(SEAL)
Attest:

KARL H. AXLINE
Attesting Officer

ROBERT C. WATSON
Commissioner of Patents